United States Patent
Cordero-Basave

(10) Patent No.: US 9,540,542 B2
(45) Date of Patent: Jan. 10, 2017

(54) CYCLOALIPHATIC RESIN, METHOD FOR OBTAINING THE SAME AND ITS APPLICATION IN A HIGH RESISTANCE COATING

(71) Applicant: CENTRO DE INVESTIGACIÓN EN POLÍMEROS S.A. DE C.V., Estado de México (MX)

(72) Inventor: Jaime Cordero-Basave, Estado de México (MX)

(73) Assignee: CENTRO DE INVESTIGACÍON EN POLÍMEROS S.A. DE C.V., Estado de México ( * ) Notice: Subject to any disclaimer, the term of this patent is extended or adjusted under 35 U.S.C. 154(b) by 91 days.

(21) Appl. No.: 14/601,743

(22) Filed: Jan. 21, 2015

(65) Prior Publication Data
US 2015/0203717 A1    Jul. 23, 2015

(30) Foreign Application Priority Data
Jan. 21, 2014 (MX) .................. MX/A/2014/000818

(51) Int. Cl.
| | | |
|---|---|---|
| *C09D 163/00* | (2006.01) | |
| *C09D 183/00* | (2006.01) | |
| *C08G 59/24* | (2006.01) | |
| *C08G 59/30* | (2006.01) | |
| *C08G 59/50* | (2006.01) | |
| *C07F 7/18* | (2006.01) | |
| *C09D 183/06* | (2006.01) | |
| *C08G 77/14* | (2006.01) | |

(52) U.S. Cl.
CPC ............ *C09D 183/06* (2013.01); *C08G 77/14* (2013.01)

(58) Field of Classification Search
None
See application file for complete search history.

(56) References Cited

U.S. PATENT DOCUMENTS

| | | |
|---|---|---|
| 4,250,074 A | 2/1981 | Foscante et al. |
| 4,359,566 A | 11/1982 | LeGrow et al. |
| 5,106,947 A | 4/1992 | Maurer et al. |
| 5,618,860 A | 4/1997 | Mowrer et al. |
| 5,804,616 A | 9/1998 | Mowrer et al. |
| 6,201,070 B1 | 3/2001 | Kumabe et al. |
| 6,247,499 B1 | 6/2001 | Lauzon |
| 2007/0213492 A1 | 9/2007 | Mowrer et al. |
| 2008/0226245 A1* | 9/2008 | Higuchi ............. C08G 18/0823 385/127 |
| 2010/0292415 A1 | 11/2010 | Reynolds et al. |
| 2013/0236649 A1 | 9/2013 | Mowrer |
| 2014/0088289 A1 | 3/2014 | Schmidt |

FOREIGN PATENT DOCUMENTS

| | | | |
|---|---|---|---|
| ES | 2139243 T3 | 2/2000 | |
| ES | 2292186 T3 | 3/2008 | |
| JP | 2005-179401 A * | 7/2005 | ............. C08G 59/14 |
| KR | 100956752 B1 | 5/2010 | |
| WO | 2007127032 A2 | 11/2007 | |
| WO | 2014003544 A2 | 1/2014 | |

OTHER PUBLICATIONS

Machine translation of JP 2005-179401 A, provided by the JPO website (no date).*
International Search Report and the Written Opinion of the International Searching Authority dated May 25, 2015, in International Application No. PCT/IB2015/050476, 16 pages.
R. Zandi-Zand et al. "Silica based organic-inorganic hybrid nanocomposite coatings for corrosion protection" Progress in Organic Coatings, 2005, vol. 53, pp. 286-291.
International Preliminary Report on Patentability, issued in corresponding International Application No. PCT/IB/2015/050476, dated Apr. 14, 2016, 22 pages.

* cited by examiner

*Primary Examiner* — Michael J Feely
(74) *Attorney, Agent, or Firm* — Rothwell, Figg, Ernst & Manbeck, P.C.

(57) ABSTRACT

There is provided a cycloaliphatic resin, from which it is possible to formulate anticorrosive coatings, using the cycloaliphatic resin alone or as hybrid with epoxy cycloaliphatic resins or hydroxy-functionalized resins; both mixed with amino or aminosilane hardeners. The obtained coatings have superior physical properties of weatherability, gloss retention, toughness and impact resistance.

23 Claims, No Drawings

CYCLOALIPHATIC RESIN, METHOD FOR OBTAINING THE SAME AND ITS APPLICATION IN A HIGH RESISTANCE COATING

PRIORITY STATEMENT AND CROSS-REFERENCE TO RELATED PATENT APPLICATIONS

This application claims priority to co-pending Mexico patent application number MX/a/2014/000818 by the same inventor, filed Jan. 21, 2014. The entirety of the contents of each application is hereby incorporated by reference herein.

BACKGROUND OF THE INVENTION

1. Field of the Invention

This invention is related to the synthesis of a cycloaliphatic resin containing silanes with epoxy and alcoxy-silanol functionalities; and its application in coating's formulations, particularly those that are weatherproof 2. Description of the Related Art Epoxy resins are well known for their excellent chemical resistance, adherence and hardness properties, so they are used in the paint and coatings industry mainly as primers for new constructions or maintenance. It is also known that epoxy resins, mainly those made of epichlorohydrin and bisphenol A, change the gloss in gloss coatings when they are exposed to sunlight, the coatings turn yellow by oxidation of the double bond of the bisphenol molecule resulting in a surface degradation phenomenon known as "chalking"; so they are rarely use as exterior coatings.

The advance in the state of the art of epoxy resins production has allowed the availability of hydrogenated epoxy-cycloaliphatic resins in recent years, which present high sunlight degradation resistance, however their reactivity with the amine hardener is substantially lower than conventional aromatic resins. There are also a large number of silanes with epoxy functionality that perform in a similar way to epoxy-cycloaliphatic resins providing chemical resistance properties, smoothness and flexibility of the epoxy resins and a weather stability comparable to that of silanes.

Polysiloxane resins are used for high temperature resistance coatings, which form very hard but very brittle films with poor decorative properties, besides being much more expensive than epoxy or alkyd resins used in decorative and industrial maintenance. With these contrasting features, both types of resins are not good enough to be incorporated in an ideal coating that meets the high performance requirements of hardness, smoothness, gloss and strength desired in the coatings industry; recent developments have found that both types of contrasting resins complement each other when combined in suitable amount and type, forming hybrid epoxy-polysiloxane resins.

U.S. Pat. No. 4,250,074 (Raymond E. Foscante et al. granted in 1981) discloses a hybridization procedure wherein epoxy and silane polymers are mixed, both finish their polymerization reacting simultaneously, the epoxy polymer reacts with a difunctional amine and the polysiloxane reacts internally through hydrolytic polycondensation. The hybrid polymer is an interpenetrating polymer network (IPN) which forms a film resistant to UV radiation without chalking and has good gloss retention, but the film is brittle and has low impact and abrasion resistance.

U.S. Pat. No. 5,618,860 (Norman R. Mowrer et al. granted in 1997) discloses the use of epoxy cycloaliphatic resins mixed with hydrolyzed silanes which are reacted with an amino-silane hardener and an appropriate organometallic catalyst. The hybrid polymer produces a film with superior hardness and weather resistance compared to a pure epoxy film, however the problems of rigidity, lack of flexibility and impact resistance are still present due to the continuous reactivity of the remaining radicals.

In later inventions, such as the U.S. Patent application No. 2007/0213492 (Norman R. Mowrer et al., published on Sep. 13, 2007) (PPG), cycloaliphatic resins are also used in hybridization with silane intermediates, such as methoxy-functional DC-3074 from Dow. Other examples include silanol functionalized resins such as DC-840 and Z6018 also from Dow Corning, that also end up in hydrolytic polycondensation aided by previous hydrolysis of the methoxy radicals from the intermediates and by water coming from atmospheric humidity. In this latest development, the silane intermediates necessarily require intermixing with hydrogenated epoxy resins or silanes with epoxy functionality.

The need to protect stone, metal, wood, plastic, cement and others substrates is permanent. This requires the use of coatings having very good impact resistance, toughness, weatherability and gloss retention and that allow hybridization with either epoxy or other resins such as acrylic, polyester or polysiloxane to achieve specific characteristics of performance and cost.

SUMMARY OF THE INVENTION

A first object of the invention consists in providing a resin that meets the high performance requirements of hardness, smoothness, gloss and strength desired in the coatings industry.

Still another object of the invention consists in providing coatings having very good impact resistance, toughness, weatherability and gloss retention.

Another object consists of providing coatings that allow hybridization with either epoxy or other resins such as acrylic, polyester or polysiloxane.

All the objects of the invention are solved by providing a cycloaliphatic resin by synthesis of a cycloaliphatic resin containing the reaction product of hydrogenated bisphenol and silanes with epoxy and alkoxy-silanol functionalities; and its application in coatings formulations. Said cycloaliphatic resin can avoid the triple mixing of epoxy resins with functional alkoxy silanes and functional silanols reacted with amino-silanes for producing hybrid resins for the formulation of corrosion protection coatings for industrial maintenance.

DETAILED DESCRIPTION OF THE INVENTION

The First embodiment of the invention describes obtaining the cycloaliphatic resin comprising silanes with epoxy and alcoxy-silanol functionalities from the reaction of a hydrogenated bisphenol and an epoxy functional silane with methoxy, ethoxy or propoxy end groups.

The cycloaliphatic resin is obtained by an etherification reaction of an epoxy-functional silane with the general formula:

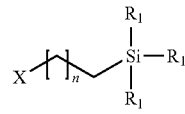

Where each $R_1$ is independently selected from methyl, methoxy, ethoxy or propoxy; "X" can be an epoxy-cyclohexyl or glycidoxy group; and "n" is an integer between 1 and 6.

With a hydrogenated bisphenol with formula

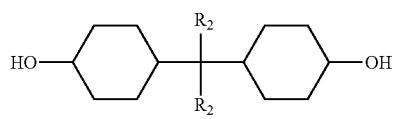

Where $R_2$ can be methyl, ethyl or hydrogen.

The epoxy-functional silane is between 30 and 75%, preferably from 50 to 65% by weight of the total components of the cycloaliphatic resin.

And the hydrogenated bisphenol is from 30 to 70%, preferably from 35 to 65% by weight of the total components of the cycloaliphatic resin.

Preferably the hydrogenated bisphenol is selected from hydrogenated bisphenol A or hydrogenated bisphenol F.

Preferably the epoxy-functional silane can be 3-glycidyloxy-propyl-trimethoxy-silane, 3-glycidyloxy-propyl-triethoxy-silane, γ-Glycidoxy-propyl-triethoxy-silane, 3-glycidyloxy-propyl-tripropoxy-silane, 3-glycidoxy-propyl-methyl-diethoxy-silane, 2-(3,4 epoxy-cyclohexyl)ethyl-trimethoxy-silane, β-(3,4 epoxy-cyclohexyl)ethyl-triethoxy-silane, more preferably the epoxy-functional silane is 3-glycidyloxy-propyl-trimethoxy-silane.

The epoxy-functional silane comprises a glycidyl function at one end and methoxy, ethoxy or propoxy radicals linked to the silicon of the epoxy-functional silane. The reaction is carried out at low temperature in a range from 90° C. to 160° C., in the presence of an organometallic catalyst. As a product of this reaction an alcohol is generated, which corresponds to the type of epoxy-functional silane used, from 70 to 90% of the expected theoretical stoichiometric value is extracted, methoxy functionalized silanes are preferred because better yields are obtained.

The cycloaliphatic rings of the hydrogenated bisphenol impart superior mechanical and chemical properties to the molecule when combined with the epoxy-functional silane by alcoholysis between hydroxyl end groups of the hydrogenated bisphenol and the methoxy, ethoxy or propoxy end groups of the epoxy-functional silane, providing an oxirane end group to the molecule, which can react with amine o amino-silane hardeners, and one or more methoxy or ethoxy moieties are available for combination with other functional groups to enable it to form hybrids with eg polysiloxanes, acrylics or epoxies.

The etherification reaction can be carried out in a molar ratio of 0.7:1.0 to 2.5:1.0 between the epoxy-functional silane and the hydrogenated bisphenol, one or two molecules of the epoxy-functional silane per mol of hydrogenated bisphenol is preferred; by using a higher molar ratio of epoxy-functional silane more end groups are available, forming a denser and stronger linking with the versatility of having the option of forming hybrids with other type of resins.

Preferably, the epoxy-functional silane must have at least two end groups methoxy, ethoxy or propoxy available in the molecule, at least one of them can react with the hydroxyl groups of the hydrogenated bisphenol. In this reaction an alcohol is generated, which corresponds to the type of epoxy-functional silane used, the alcohol must be extracted since the reaction is reversible.

The amount of alcohol generated is the same in all cases, because it depends on the amount of hydroxyl end groups of the hydrogenated bisphenol.

The reaction for obtaining the cycloaliphatic resin is promoted by organometallic catalysts such as zinc octoate or tin laureate.

Due to the type of components used in obtaining the cycloaliphatic resin the addition of water is not required.

Optionally an alkyl silicate can be added during the process of obtaining the cycloaliphatic resin, the alkyl silicates have methyl, ethyl, propyl, butyl or hydroxyl end groups that can more readily react with the non reacted end groups methoxy, ethoxy or propoxy of the etherification reaction between the hydrogenated bisphenol and the epoxy-functional silane.

Preferably the alkyd-silicate is selected from the group consisting of tetra methyl ortho silicate, tetra ethyl ortho silicate, tetra propyl ortho silicate or tetra butyl ortho silicate, wherein the alkyl-silicates can be hydrolyzed o partially hydrolyzed.

In this case the cycloaliphatic resin would be obtained from:

(a) 30 to 60% of a hydrogenated bisphenol preferably from 35 to 50% by weight of the total components of the cycloaliphatic resin;

(b) 30 to 70% of an epoxy-functional silane, preferably from 30 to 65% by weight of the total components of the cycloaliphatic resin;

(c) 10 to 40% by weight of the total components of the cycloaliphatic resin, of an alkyd-silicate and (d) Up to 5% by weight of the total components of the cycloaliphatic resin, of an organometallic catalyst such as zinc octoate or tin laureate.

The curing mechanism of the cycloaliphatic resin may be carried out by polyfunctional amines or amino-silanes, which can react with glycidyls, and by reaction of the unreacted methoxy end groups with hydroxyl groups produced by the reaction of epoxy oxiranes with the amines.

This cycloaliphatic resin has the potential to form an epoxy polysiloxane formulated alone, or it can be mixed with other resins such as epoxies mainly in order to strengthen its chemical resistance. It can also be modified with other resins such as acrylics, in this case it is possible to obtain a triple hybrid acrylic-epoxy-polysiloxane resin with high chemical and mechanical resistance and high exterior stability.

In a second embodiment of the invention a two package polysiloxane-epoxy coating is formulated as in the case of the resin of the first embodiment. Properly formulated coating has impact resistance, toughness, flexibility, weatherability and gloss retention, the formulated coating contains:

(a) 15 to 55% by weight of a cycloaliphatic resin obtained according the first embodiment of the invention;

(b) 10 to 20% by weight of an amino-polyfunctional hardener or amino-silane with end groups methoxy or ethoxy;

(c) Up to 5% by weight of an organometallic catalyst and (d) Pigments and aggregates.

Due to the composition of the cycloaliphatic resin the addition of water is not required in the coatings formulation or in the process for obtaining it.

The hardener can be an amino polyfunctional molecule, for example an aliphatic amine, amine adduct, polyamidoamine, cycloaliphatic amine, aromatic amines Mannich bases which may be substituted wholly or in part with an aminosilanes having the general formula:

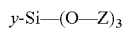

where "Z" can be alkyd, hydroxyalkyd, alkoxyalkyl, wherein the number of carbons is less than about six; "y" is H(HNR)n, where "R" is aryl, alkyl, alkoxyalkyl or cycloalkyl and "n" is an integer between 2 and 6. "R" can vary within each "y" molecule.

The organometallic catalyst is selected from zinc octoate, tin laureate or organo-titanates preferably dibutyl titanate.

The composition may also contain other compounds such as rheology modifiers, dispersants, wetting agents, plasticizers, defoamers, and solvents, to achieve the desired strength and application properties.

In a third embodiment of the invention a two package coating is formulated as in the case of the cycloaliphatic resin of first embodiment with at least one non aromatic epoxy resin and/or at least one acrylic resin. The coating has the desired mechanical, weatherability and gloss retention characteristics.

Due to its characteristics and its composition the cycloaliphatic resin according the first embodiment of the invention can replace the mixtures described in the patents U.S. Pat. No. 4,250,074; U.S. Pat. No. 5,618,860 and U.S. Pat. No. 6,639,025 (Haruji Sakugawa), wherein an hydrogenated epoxy and a polysiloxane resin are added together to an organo-oxisilano resin, and subsequently hardened with amino-silanes, wherein the polysiloxane and the organo-oxisilane resins are hydrolyzed with added water and the produced silanols are polycondensed forming a lineal complex polymer with the epoxy resin.

Due to the composition of the cycloaliphatic resin the addition of water is not required in the coatings formulation or in the obtaining process.

The coating formulation according to the third embodiment allows the simultaneous formation of two polymers reacting each one with its corresponding hardener, cross-linking to form an intricate network of chemical bonds which result in the formation of a film with a superior strength compared to that of the common epoxy type films, likewise it will have better chemical resistance and physical properties of such as hardness, toughness, flexibility, adhesion, gloss retention, resistance to degradation from ultraviolet rays from sunlight arising from the presence of cycloaliphatic cores, sufficient silicon groups to protect the complex hybrid molecule as well as the formation of linear polymers of cycloaliphatic epoxy resins with polysiloxane amines.

The hybrid coating according to the third embodiment of this invention is prepared containing:

At least one non aromatic epoxy resin and/or at least one hydroxylated acrylic resin;

(a) A cycloaliphatic resin obtained according the first embodiment of the invention;

(b) A hardener compound;

(c) An organometallic catalyst and (d) Pigments and aggregates.

The composition may also contain other compounds such as rheology modifiers, dispersants, wetting agents, plasticizers, defoamers, and solvents, to achieve the desired strength and application properties.

The non-aromatic epoxy resins are of cycloaliphatic or aliphatic type containing more than one, preferably two epoxy groups per molecule, and preferably should be liquid and have an equivalent weight per epoxy group of 150 to 2000 and preferably 150 to 500. The preferred cycloaliphatic epoxy resins are diglycidyl ether of hydrogenated bisphenol A type and diglycidyl ether of hydrogenated Bisphenol F type. The preferred aliphatic epoxy resins are of the type obtained from the reaction of polypropylenglycol with epichlorohydrin. The preferred epoxy resin ratio ranges from 15 to 45% by weight of total resins, with preferred ratio of at least 25% by weight.

The hardener can be a polyfunctional amine, for example an aliphatic amine, amine adduct, polyamidoamine, cycloaliphatic amine, aromatic amines Mannich base, which may be substituted wholly or in part with an aminosilane having the general formula:

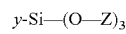

where "Z" can be alkyd, hydroxyalkyd, alkoxyalkyl, wherein the number of carbons is less than about six carbon; "y" is H(HNR)n radical, where "R" is aryl, alkyl, alkoxyalkyl or cycloalkyl radicals and "n" is an integer between 2 and 6. "R" can vary within each "y" molecule.

Preferably at least 0.7 equivalents of amine per equivalent of epoxy may be present in the hardener component and the amine can be bifunctional or polyfunctional.

The curing chemical reactions of the coating when it contains at least one epoxy resin and the cycloaliphatic resin of the first embodiment may consist in an addition reaction of the epoxy resin with amines leaving a hydroxyl end group in substitution, which can be added to non-reacted methoxy, ethoxy or propoxy end groups of the cycloaliphatic resin present in the mixture. The same reaction between the epoxy resin and the amino-silane can also be effected with the oxirane radical of the cycloaliphatic resin.

In each combination of the amine with the epoxy radicals, a hydroxyl group can be formed, which can in turn be combined with a methoxy, ethoxy or propoxy group, and hence generating the corresponding alcohol.

A coating formulated according to the third embodiment of the invention may contain:

(a) 15 to 55% by weight of a cycloaliphatic resin obtained according the first embodiment of the invention;

(b) 15 to 45% by weight of a non aromatic epoxy resin having at least two epoxy groups per molecule;

(c) 10 to 20% by weight of a hardener amino-polyfunctional or amino-silane with methoxy or ethoxy end groups;

(d) Up to 5% by weight of an organometallic catalyst and (e) Pigments and aggregates Variants and compositions of the second and third embodiments of the invention are in all cases, two components resinous coatings systems packed in two separate containers that are mixed together before using them.

In this third embodiment the formulated coating also may contain:

(a) 20-60% by weight of a cycloaliphatic resin obtained according to the first embodiment of the invention;

(b) 10-30% by weight of a hydroxylated acrylic resin with an equivalent weight in the range from 600 to 1000 grams per equivalent of hydroxyl;

(c) 10-30% by weight of a hardener of polyamines or amino-silanes;

(d) Up to 5% by weight of an organometallic catalyst and (e) 10 to 40% by weight of pigments, fillers, additives and solvents.

In this case the cycloaliphatic resin of the first embodiment is hydrolyzed in combination with a functional acrylic resin, which reacts chemically with end groups of the cycloaliphatic resin and/or with end groups of the hardener.

The organometallic catalyst promote the alcoholysis reactions between the cycloaliphatic resin and the hydroxylated acrylic resin; the organometallic catalyst promote the hydrolytic condensation of the silanol radical complex that can be formed by reactions between amine-glycidylo hydroxyl radicals of the functional acrylic resin and free hydroxyl radicals of the alkyd-silicate, the hydrolysis is completed by the presence of environmental humidity transforming methoxy, ethoxy and propoxy groups into hydroxyl radicals.

The organometallic catalyst is selected from zinc octoate, tin laureate or organo-titanates preferably dibutyl titanate.

Some preferred amino-silane hardeners by their characteristics are: N-(3-(trimethoxysilyl)propyl)ethylenediamine; N-(3-(trimethoxysilyl)propyl)diethylentriamine; N,N-bis(3-(trimethoxysilyl)propyl)-1,2-ethanediamine; N,N'-bis(3-(trimethoxysilyl)propyl)-1,2-ethanediamine; Bis(trimethoxysilylpropyl)amine; Bis(3-triethoxysilylpropyl)amine; aminoethylaminopropyltrimethoxysilane; aminopropyltrimethoxysilane; γ-aminopropyltrimethoxysilane; 3-aminopropyltrimethoxysilane; aminopropyltriethoxysilane; 3-aminopropyltriethoxysilane; γ-aminopropyltriethoxysilane; triaminopropytrimethoxysilane; N(β-aminoethyl)-γ-aminopropyltrimethoxysilane; N-2-aminoethyl-3-aminopropyltrimethoxysilane; N(β-aminoethyl)-γ-aminopropylmethyldimethoxy-silane; 4-(amino)-3,3 (dimethyl-butyl)trimethoxysilane; N-(2-aminoethyl)-3-aminopropylmethyldimetoxysilane; N-(n-Butyl)-3-aminopropyltrimethoxysilane; 3-aminopropylmethyldiethoxysilane; N-Benzyl-N-amino-ethyl-3-aminopropyltrimethoxysilane-chlorhydrate; 3-(2-aminoethyl)aminopropyl phenyl silsesquioxanes methoxy-terminated; polydimethylsiloxanes with aminoalkyd groups; silylated polyazamide; aminofunctional, methyl phenyl silicone resin solution; oligomeric diamino-silane.

The aminopropyltrimethoxysilane is especially preferred by its characteristics of functionality and in general the difunctionals amino-silanes are preferred, because they combine the presence of two hydrogen radicals that react with the oxirane radicals of the non-aromatic epoxy resins in modified formulas, or also with oxirane radicals of the cycloaliphatic resin according the first embodiment of the invention, forming linear non crosslinked polymers that exhibit improved resistance to environmental conditions.

Example 1

A cycloaliphatic resin was prepared by reacting: about 150 grams of hydrogenated bisphenol A, which were dissolved in about 130 grams of glycidoxy-propyl-triethoxy-silane, heating was started and maintained until the melting of hydrogenated bisphenol A was reached at a temperature about 140° C. To the clear solution 1.2 grams of zinc octoate were added producing abundant methyl alcohol generation. The alcohol was extracted until about 28 to 30 grams of alcohol were obtained. At this point it was considered that the reaction was completed, having a clear resin.

Example 2

One resin epoxy-silane coating (a main object of the invention) was prepared. 530 grams of the cycloaliphatic resin prepared according the example 1; 2.65 grams of a salt of alkylamide with acid groups as dispersant; 113 grams of titanium dioxide; 50 grams of butyl acetate; 5.3 grams of dibutyltin laureate and 5.3 grams of water were added in a stirred vessel. The blend was dispersed until a uniform mixture was obtained and subsequently 4 grams of dibutyl titanate were added, stirring was kept for 30 minutes. The blend was cured with 60 grams of amine polyester with equivalent weight of 230. The blend can be applied at room temperature with conventional spraying, brush, or roller application methods; obtaining a smooth, shiny and hard film, with high resistance to ultraviolet rays, without chalking formation on sun exposure and with excellent flexibility.

Example 3

A hybrid coating was prepared by blending: 530 grams of the cycloaliphatic resin prepared according to example 1; about 480 grams of cycloaliphatic epoxy resin with an equivalent weight of 225 and about 300 grams of titanium dioxide were dispersed in the blend with a salt of alkylamide as dispersion additive until a fineness of 6 Hegman was obtained in the grind. The obtained paste was reacted with 500 grams of amine-functional resin with equivalent weight of 230 and it was thinned with 150 grams of butyl acetate for easy spray application to a wet film thickness of 0.15 to 0.18 mm (6 to 7 mils). Dry to touch was accomplished in about 5 hours, and a smooth film with 98% Gardner gloss units was obtained on the following day. An H hardness was achieved according to BYK-Gardner pencil hardness test and the film also exhibited excellent flexibility. The dry film with a thickness of 0.10 to 0.13 mm (4 to 5 mils) had excellent impact and ultraviolet light resistance.

Example 4

A modified silane-epoxy resin was prepared. In a stirred flask equipped with extraction condensates system 250 grams of glycidoxy-propyl-triethoxy-silane were added, then stirring and heating was started. 140 grams of hydrogenated bisphenol A and 2 grams of zinc octoate were added in 60 minutes When the temperature reached 100 to 105° C. alcohol was generated and hydrogenated bisphenol A began to dissolve in the system. The temperature was maintained at 150° C. for two hours after which the temperature tended to rise and the alcohol generation finished, 64 grams of methyl alcohol were extracted. At this point the reaction was completed. 40 grams of the prepared resin were mixed with 20 grams of a hydroxylated acrylic resin with an OH equivalent weight between 600 and 800 grams, and then the blend was applied by conventional spray, brush, or roller methods on a clean metal panel. After about 2 hours of drying it is obtained a smooth, transparent, flexible and hard film with excellent resistance to light, the silane-epoxy resin was very appropriate to formulate a high weather and high temperature resistance coating with up to 260° C. continuous heat resistance.

Although the present invention has been described with considerable detail with reference to certain preferred variations thereof, other variations are possible. Therefore, the spirit and scope of the appended claims should not be limited to the preferred variations described herein.

The invention being thus described may be varied in many ways for a person skilled in the art. Such variations are not to be regarded as a departure from the spirit and scope of the invention, and all such modifications as would be obvious to one skilled in the art are considered to be included within the scope of the following claims.

What is claimed is:

1. A cycloaliphatic resin obtained by an etherification reaction of a reaction mixture comprising:
   a) an epoxy functional silane with the formula

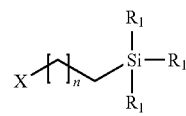

where each $R_1$ is independently selected from methyl, methoxy, ethoxy and propoxy, provided that at least one $R_1$ is not methyl; "X" is epoxy-cyclohexyl or glycidoxy group; and "n" is an integer between 1 and 6; and b) a hydrogenated bisphenol with formula

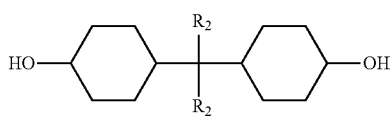

where $R_2$ is methyl, ethyl or hydrogen;
wherein the etherification reaction involves alcoholysis between a hydroxyl group of b) and a methoxy, ethoxy or propoxy group of a), providing an oxirane end group in the cycloaliphatic resin.

2. The cycloaliphatic resin according to claim 1, wherein the epoxy-functional silane is present in an amount of between 30 and 75% by weight of the total reaction mixture and is selected from the group consisting of glycidyloxy-propyl-trimethoxy-silane, glycidyloxy-propyl-triethoxy-silane and glycidyloxy-propyl-tripropoxy-silane.

3. The cycloaliphatic resin according to claim 2, wherein the epoxy-functional silane is present in an amount of between 50 and 65% by weight of the total reaction mixture.

4. The cycloaliphatic resin according to claim 1, wherein the hydrogenated bisphenol is present in an amount of between 30 and 70% by weight of the total reaction mixture and is selected from hydrogenated bisphenol A and hydrogenated bisphenol F.

5. The cycloaliphatic resin according to claim 1, wherein the reaction mixture further comprises a hydrolyzed or partially hydrolyzed alkyl silicate, which is present in an amount of from 10 to 40% by weight of the total reaction mixture.

6. The cycloaliphatic resin according to claim 5, wherein the hydrolyzed or partially hydrolyzed alkyl silicate is selected from the group consisting of tetra methyl ortho silicate, tetra ethyl ortho silicate, tetra propyl ortho silicate and tetra butyl ortho silicate.

7. An epoxy-polysiloxane coating composition comprising:
a) the cycloaliphatic resin according to claim 1; and
b) a hardener comprising a polyfunctional aliphatic amine, an amino-silane or mixtures thereof.

8. The coating composition according to claim 7, further comprising an organometallic catalyst selected from the group consisting of zinc octoate, tin laureate and dibutyl titanate, wherein the organometallic catalyst is present in an amount of up to 5% by weight of the total coating composition.

9. The coating composition according to claim 7, further comprising at least one additional ingredient selected from the group consisting of rheology modifiers, dispersants, wetting agents, plasticizers, defoamers, pigments, aggregates and solvents.

10. The coating composition according to claim 7, wherein the cycloaliphatic resin is present in an amount of between 15% and 60% by weight of the total coating composition.

11. The coating composition according to claim 7, wherein the hardener is aminopropyltrimethoxysilane.

12. The coating composition according to claim 7, further comprising at least one non-aromatic epoxy resin, at least one hydroxylated acrylic resin or mixtures thereof; wherein the at least one non-aromatic epoxy resin, when present, is present in an amount of between 15 to 45% by weight of the total coating composition; and wherein the at least one hydroxylated acrylic resin, when present, is present in an amount of between 10 to 30% by weight of the total coating composition.

13. The coating composition according to claim 12, wherein the hydroxylated acrylic resin comprises an equivalent weight in the range from 600 to 1000 grams per equivalent of hydroxyl.

14. A method for obtaining a cycloaliphatic resin comprising the steps of:
a) preparing a reaction mixture comprising:
i) a hydrogenated bisphenol with formula

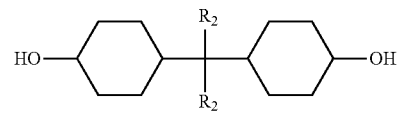

where $R_2$ is methyl, ethyl or hydrogen; and
ii) an epoxy-functional silane with the general formula

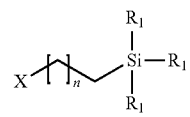

where each $R_1$ is independently selected from methyl, methoxy, ethoxy and propoxy, provided that at least one $R_1$ is not methyl; "X" is epoxy-cyclohexyl or a glycidoxy group; and "n" is an integer between 1 and 6;
b) heating the blend in a range from 90° C. to 160° C.;
c) adding an organometallic catalyst to cause an etherification reaction to occur, wherein the etherification reaction involves alcoholysis between a hydroxyl group of i) and a methoxy, ethoxy or propoxy group of ii);
d) extracting alcohol produced by the etherification reaction; and
e) obtaining a cycloaliphatic resin, wherein the cycloaliphatic resin comprises an oxirane end group.

15. The method according to claim 14, wherein the epoxy-functional silane is present in an amount of between 30 to 75% by weight of the total reaction mixture and is selected from the group consisting of glycidyloxy-propyl-trimethoxy-silane, glycidyloxy-propyl-triethoxy-silane and glycidyloxy-propyl-tripropoxy-silane.

16. The method according to claim 14, wherein the epoxy-functional silane is present in an amount of between 50 and 65% by weight of the total reaction mixture.

17. The method according to claim 14, wherein the hydrogenated bisphenol is present in an amount of between 30 and 70% by weight of the total reaction mixture and is selected from hydrogenated bisphenol A and hydrogenated bisphenol F.

18. The method according to claim 14, wherein the organometallic catalyst is selected from zinc octoate and tin laureate.

19. The method according to claim 14, wherein ii) and i) are present in the reaction mixture in a molar ratio of 0.7:1.0 to 2.5:1.0.

20. The method according to claim 14, wherein ii) and i) are present in the reaction mixture in a molar ratio of 1:1.

21. The method according to claim 14, wherein ii) and i) are present in the reaction mixture in a molar ratio of 2:1.

22. The method according to claim 14, wherein the reaction mixture further comprises a hydrolyzed or partially hydrolyzed alkyl silicate, which is present in an amount of from 10 to 40% by weight of the total reaction mixture.

23. The method according to claim 22, wherein the hydrolyzed or partially hydrolyzed alkyl silicate is selected from the group consisting of tetra methyl ortho silicate, tetra ethyl ortho silicate, tetra propyl ortho silicate and tetra butyl ortho silicate.

\* \* \* \* \*